(12) United States Patent
Hegna et al.

(10) Patent No.: US 11,573,345 B2
(45) Date of Patent: Feb. 7, 2023

(54) INLINE SOURCE

(71) Applicant: PGS Geophysical AS, Oslo (NO)

(72) Inventors: Stian Hegna, Oslo (NO); Tilman Kluever, Oslo (NO)

(73) Assignee: PGS Geophysical AS, Oslo (NO)

( * ) Notice: Subject to any disclaimer, the term of this patent is extended or adjusted under 35 U.S.C. 154(b) by 341 days.

(21) Appl. No.: 16/793,093

(22) Filed: Feb. 18, 2020

(65) Prior Publication Data
US 2020/0271806 A1 Aug. 27, 2020

Related U.S. Application Data

(60) Provisional application No. 62/908,786, filed on Oct. 1, 2019, provisional application No. 62/808,520, filed on Feb. 21, 2019.

(51) Int. Cl.
G01V 1/38 (2006.01)
G01V 1/00 (2006.01)

(52) U.S. Cl.
CPC ............ *G01V 1/3861* (2013.01); *G01V 1/006* (2013.01); *G01V 1/3808* (2013.01); *G01V 2210/1214* (2013.01); *G01V 2210/1293* (2013.01)

(58) Field of Classification Search
CPC .... G01V 1/3861; G01V 1/006; G01V 1/3808; G01V 2210/1214; G01V 2210/1293
USPC .................... 367/23; 181/111, 113, 118–120
See application file for complete search history.

(56) References Cited

U.S. PATENT DOCUMENTS

| | | | |
|---|---|---|---|
| 3,953,826 A | 4/1976 | Brundrit et al. | |
| 4,038,630 A | 7/1977 | Chelminski | |
| 4,064,479 A * | 12/1977 | Ruehle | G01V 1/20 181/111 |
| 6,906,981 B2 | 6/2005 | Vaage | |
| 7,257,049 B1 | 8/2007 | Laws et al. | |
| 8,014,228 B2 | 9/2011 | Schreurs et al. | |
| 8,102,731 B2 | 1/2012 | Cambois | |
| 8,824,239 B2 | 9/2014 | Welker et al. | |
| 9,134,442 B2 | 9/2015 | Dellinger et al. | |
| 9,207,347 B2 | 12/2015 | Frivik et al. | |
| 9,250,343 B2 | 2/2016 | Voldsbekk | |
| 9,360,578 B2 | 6/2016 | Hopperstad et al. | |
| 9,684,086 B2 | 6/2017 | Hegna et al. | |
| 9,753,163 B2 | 9/2017 | Laws | |
| 9,903,966 B2 | 2/2018 | Hegna et al. | |
| 10,126,452 B2 | 11/2018 | Halliday et al. | |
| 2012/0147701 A1 | 6/2012 | Ross et al. | |

(Continued)

FOREIGN PATENT DOCUMENTS

| | | |
|---|---|---|
| GB | 2557722 A | 6/2018 |
| WO | 2017063634 | 4/2017 |

OTHER PUBLICATIONS

Egil Pedersen,; "A Nautical Study of Towed Marine Seismic Streamer Cable Configurations"; Norwegian University of Science and Technology Faculty of Marine Technology, Doctoral Thesis in Nautical Engineering (1996) (353 pgs).

(Continued)

*Primary Examiner* — Ian J Lobo

(57) ABSTRACT

An inline source can be used for a marine survey. For example, a marine survey vessel can tow source units in line. The source units can be actuated near-continuously to cause a respective signal emitted by each of the source units to be uncorrelated with signals emitted by other of the source units.

22 Claims, 9 Drawing Sheets

(56) References Cited

U.S. PATENT DOCUMENTS

| | | | |
|---|---|---|---|
| 2014/0269173 A1 | 9/2014 | Coste et al. | |
| 2015/0063064 A1 | 3/2015 | Van Groenestjin | |
| 2015/0260867 A1 | 9/2015 | Abma et al. | |
| 2017/0176620 A1 | 6/2017 | Lima et al. | |
| 2017/0371055 A1* | 12/2017 | Poole | G01V 1/366 |
| 2018/0164461 A1 | 6/2018 | Halliday et al. | |

OTHER PUBLICATIONS

International Search Report & Written Opinion for related PCT Application PCT/EP2020/054595, dated May 27, 2020 (15 pgs).
Examination Report in counterpart GB Patent Application GB2111669.4, dated Aug. 4, 2022.

* cited by examiner

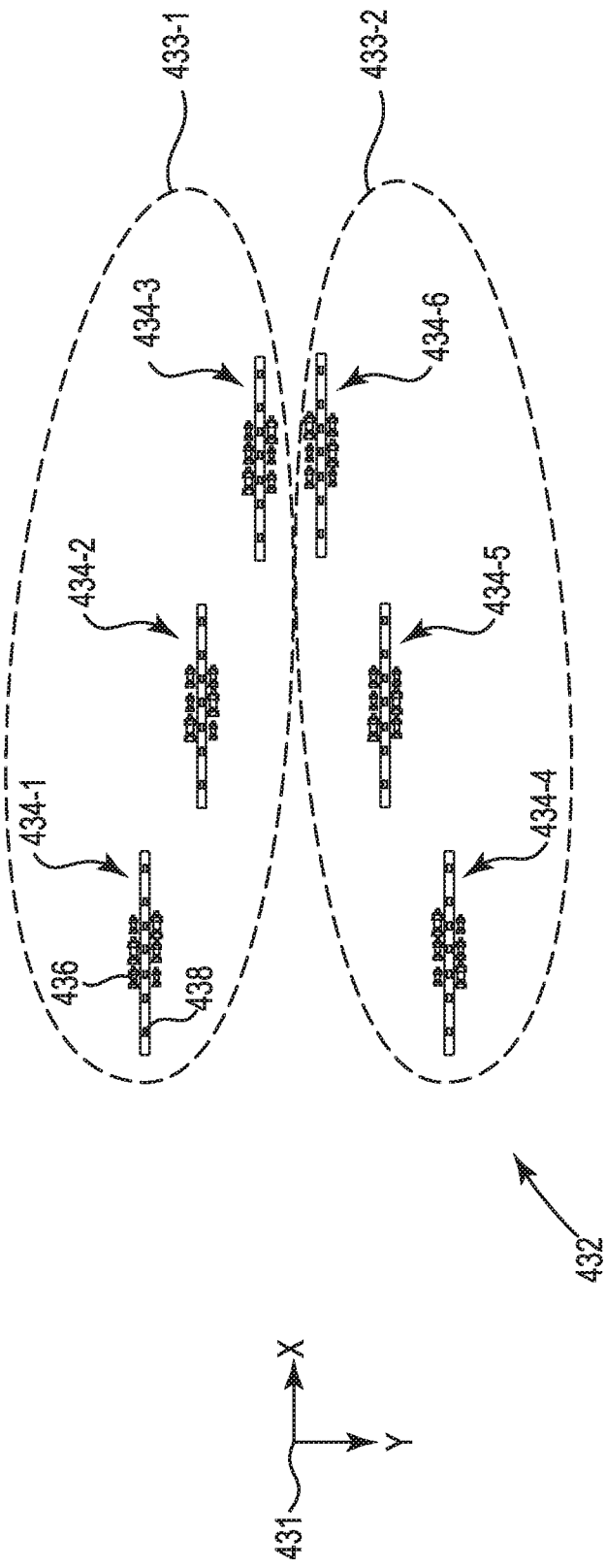

INLINE SOURCE

CROSS-REFERENCE TO RELATED APPLICATIONS

This application claims priority to U.S. Provisional Application 62/808,520, filed Feb. 21, 2019, and U.S. Provisional Application 62/908,786, filed Oct. 1, 2019, which are incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

BRIEF DESCRIPTION OF THE DRAWINGS

FIG. 4 illustrates a plan or xy-plane view of an example of an embodiment of a source array including a plurality of strings with different crossline positions.

DETAILED DESCRIPTION

Figure 1:
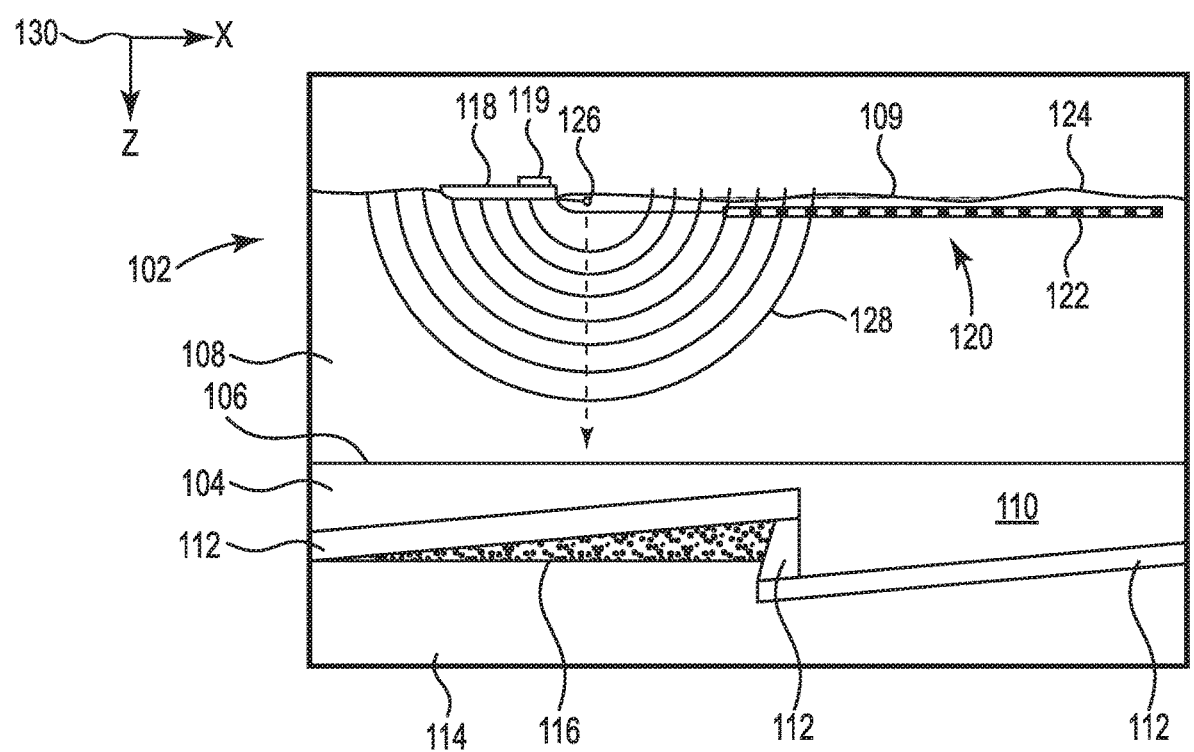
FIG. 1 illustrates an elevation or xz-plane view of a marine survey in which signals are emitted by a source for recording by receivers.

The present disclosure is related to marine surveying using an inline source. In a land-based acquisition using a vibrator as a source, a total amount of energy put into the ground and a signal-to-noise ratio of data from the land-based acquisition can be improved by extending a sweep length. For example, the temporal length of signals generated by the vibrator can be extended. Extending the sweep length can improve the signal-to-noise ratio because the source is stationary while sweeping so that the total amount of energy generated in the stationary source location is increased by a factor that is proportional to the square root of the sweep length in time.

In a marine towed streamer acquisition, one or more sources and one or more streamers can be towed behind a moving marine survey vessel. Because the sources are in motion, extending the temporal length of a signal generated by any individual source element will not have the same effect as in land-based acquisition with a stationary source. However, according to at least one embodiment of the present disclosure, the temporal length of a signal generated by a source array at a stationary location can be extended by towing a source array including a plurality of source elements in an inline string and operating the plurality of source elements in a manner that effectively extends a signal emitted at the location in time.

In some previous approaches, an inline length of a source may be limited. For example, if one source element is towed behind a marine survey vessel while emitting signals near-continuously, then, in principle, the source element emits a spike at each location during the time period when the source element is emitting signals. However, in practice, the temporal length of a signal emitted by a source element at each location may not be a perfect spike because seismic data may not be processed to infinite temporal and spatial resolution. The effective temporal length at a location of a signal emitted by a source element will be longer corresponding to a lesser resolution at which seismic data is processed. According to at least one embodiment of the present disclosure, to further extend the effective temporal length at a location of a signal emitted by a source array and to improve the signal-to-noise ratio, the source array can have an extended length in an inline direction. At least one embodiment of the present disclosure is related to extending the length of sources by deploying multiple source elements in strings of source elements.

As used herein, "near-continuous" means without meaningful breaks. As would be understood by one of ordinary skill in the art with the benefit of this disclosure, operational circumstances can cause intermittent gaps in signal emission, and "near-continuous" should be read to include intermittent or periodic gaps, whether planned or unplanned, as well as signal emission without intermittent or periodic gaps, thus including continuous signal emission. For simplicity, the term "near-continuous" is used herein and does not exclude "continuous".

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection. As used herein, "a location" refers to an absolute place, such as may be quantified by earth coordinates or map coordinates, while "a position" refers to a place relative to another place or object. For example, a location may be given by global positioning system (GPS) coordinates, while a position may be given by a distance and heading from another place or object.

The figures herein follow a numbering convention in which the first digit or digits correspond to the drawing figure number and the remaining digits identify an element or component in the drawing. Similar elements or components between different figures may be identified by the use of similar digits. For example, 232 may reference element "32" in FIG. 2, and a similar element may be referenced as 332 in FIG. 3. Analogous elements within a Figure may be referenced with a hyphen and extra numeral or letter. See, for example, elements 234-1, and 234-2 in FIG. 2. Such analogous elements may be generally referenced without the hyphen and extra numeral or letter. For example, elements 234-1 and 234-2 may be collectively referenced as 234. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an elevation or xz-plane 130 view of marine surveying in which signals are emitted by a source 126 for recording by receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 104 of sediment and rock below the surface 106 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 104, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys in accordance with the present disclosure. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a receiver that detects variations in pressure. However, embodiments are not so limited. Surveys can include receivers 122 that are only pressure sensors, only motion sensors, pressure and motion sensors, or electromagnetic sensors, among others. In one type of marine survey, each receiver, such as the receiver 122, comprises an electromagnetic receiver that detects electromagnetic energy within the water. The streamers 120 and the marine survey vessel 118 can include sensing electronics and data-processing facilities that allow receiver readings to be correlated with absolute locations on the sea surface and absolute three-dimensional locations with respect to a three-dimensional coordinate system. In FIG. 1, the receivers along the streamers 120 are shown to lie below the sea surface 109, with the receiver locations correlated with overlying surface locations, such as a surface location 124 correlated with the location of receiver 122.

The marine survey vessel 118 can tow a source 126 that produces signals as the marine survey vessel 118 and streamers 120 move across the sea surface 109. The source 126 can include a plurality of source elements. As used herein, a "source element" is a single source device, such as an air gun or marine vibrator. Individual source elements can be actuated together or separately. A "source unit" is one source element or a plurality of source elements that are either actuated simultaneously or actuated in sequence with systematic or random time intervals. As used herein, "random" (or grammatical variations thereof) means either random or pseudorandom (e.g., statically random, but not actually random). The term "source array" generically refers to a plurality of source elements or a plurality of source units. As used herein, the term "source" refers to one or more single source devices, arranged as a source element, source unit, or source array. Although illustrated as a point, the source 126 can represent a source unit. Although not specifically illustrated, the source 126 can include at least one marine impulsive source element and at least one marine non-impulsive source element. An impulsive source unit is a source unit that produces a sharp signal of relatively short duration in contrast to a non-impulsive source unit that produces a signal of relatively long duration. The sharp signal of relatively short duration may be referred to as an impulse. The source 126 and/or streamers 120 may also be towed by other vessels or may be otherwise disposed in fluid volume 108. For example, the receivers may be located on ocean bottom cables or nodes fixed at or near the surface 106. Another source (not specifically illustrated) may be disposed in a nearly fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. The marine survey vessel 118 can include a controller 119. For example, the controller 119 can be coupled to the source 126 to control actuation of the source 126.

FIG. 1 shows acoustic energy illustrated as an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the surface 106, at which point the outward and downward expanding down-going wavefield 128 may partially scatter, may partially reflect back toward the streamers 120, and may partially refract downward into the subsurface volume 104, becoming elastic signals within the subsurface volume 104.

Figure 2:
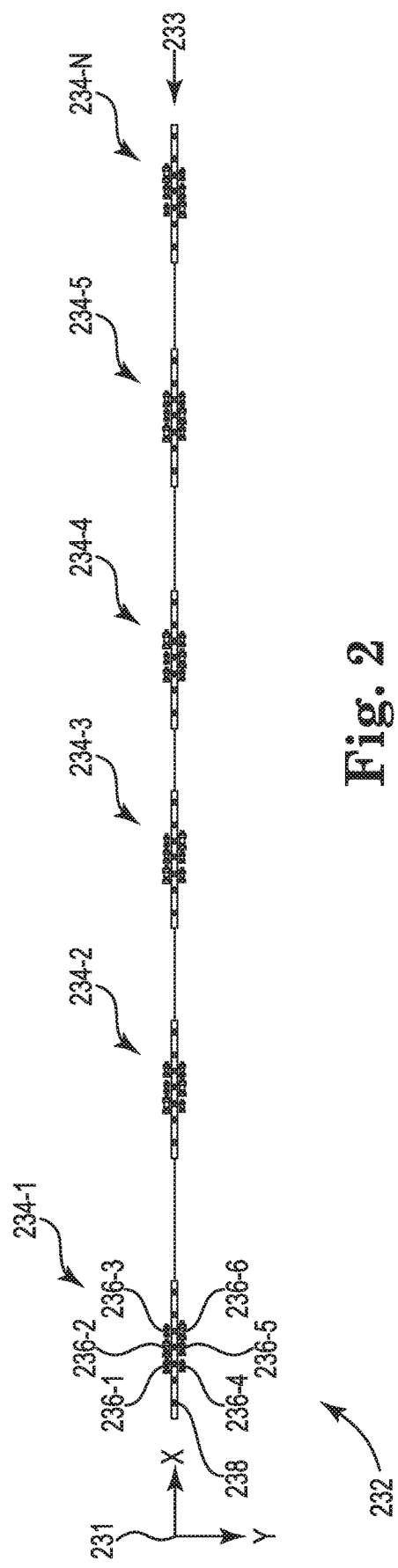
FIG. 2 illustrates a plan or xy-plane view of an example of an embodiment of an inline source array.

FIG. 2 illustrates a plan or xy-plane 231 view of an example of an embodiment of an inline source array 232. The source array 232 includes a plurality of source units 234-1, 234-2, 234-3, 234-4, 234-5, . . . , 234-N arranged in a single string 233. Embodiments are not limited to a source array 232 including any specific number of source units 234. Each of the source units 234 includes a plurality of source elements 236. For example, the source unit 234-1 includes six source units 236-1, 236-2, 236-3, 236-4, 236-5, 236-6. Embodiments are not limited to a source unit 234 including any specific number of source elements 236. The source elements 236 of a source unit 234 can be of a same or of different types. For example, the source elements 236-1, 236-2, 236-3, 236-4, 236-5, 236-6 can all be an air guns or can all be marine vibrators. As another example, the source elements 236-1, 236-2, 236-3, 236-4 can be air guns and the source elements 236-5, 236-6 can be marine vibrators. Different source elements 236 of a source unit 234 that are of a same type can have different strengths. For example, the source elements 236-3 and the source elements 236-4 can each have a same first strength that is less than a same second strength of each the source elements 236-1 and the source elements 236-5, which is less than a same third strength of each of the source elements 236-2 and the source elements 236-6. A source unit 234 can include a number of receivers, such as the nearfield hydrophone 238, coupled thereto for recording a signal emitted by the source unit 234. In at least one embodiment, each source unit 234 can be coupled to a respective float and the respective floats can be coupled to each other by a cable.

Although the source elements 236-1, 236-2, 236-3, 236-4, 236-5, 236-6 are coupled on both crossline sides of the source unit 234-1, for purposes of the present disclosure, they are considered to be coupled in line because their crossline separation (separation in the crossline direction) is substantially less than an inline length of the source array 232. For example, source elements can be considered to be coupled in line if their crossline distance is at least an order of magnitude less than the total inline distance of the source array 232. The crossline separation can be based on a desired crossline resolution. For source units in different crossline positions, provided that the respective amplitude level emitted in each crossline position is approximately the same, there will be a notch in the horizontal wavenumber spectrum at 1/(source width). The Nyquist wavenumber for a given sampling is 1/(2*dy), where dy is the desired spatial sampling crossline. Therefore, if the desired crossline sampling is 12.5 meters, the Nyquist wavenumber is ¹⁄₂₅ meters, and the width of the source should not be greater than or equal to 25 meters. The inline direction is the direction of towing, or in the direction of the x-axis, opposite of the arrow, as illustrated in FIG. 2. The crossline direction is perpendicular to the direction of towing, or in the direction of the y-axis as illustrated in FIG. 2.

For purposes of source deconvolution, the entire string 233-1 can be solved for as a single source. Deconvolution is the inverse to convolution. Deconvolution includes reversing the effects of convolution in seismic data. Recorded seismic data (a measured wavefield) can represent a convolution of a source wavefield with an earth response. Deconvolution of the source wavefield involves transforming the measured wavefield into a wavefield as if it had been acquired with a source emitting a band limited spike in desired discrete positions. An earth response can contain the propagation effects including surface multiples. Convolution in a time-space domain can be written as multiplication in a frequency-wavenumber domain, while deconvolution is a division in the frequency-wavenumber domain.

To perform a stable deconvolution of source wavefields (signals emitted by individual source units) from a measured wavefield (a combined signal), it is desirable to have low correlation between the signals emitted by individual source units. Correlation may also be referred to as cross-correlation and is a measure of similarity between signals as a function of displacement of one signal relative to another. Correlation may be represented by a correlation coefficient, which is a numerical measure of correlation as a statistical relationship between two signals. Formally, two signals are uncorrelated if their correlation coefficient is zero, indicating that no two points in their time domain are associated with each other (a value cannot be predicted at another time from a value at a given time). However, as used herein, signals being uncorrelated means that the signals have a negligible correlation that may also be referred to as a low correlation. At least one embodiment can include operating the source elements to emit a wavefield that is as white as possible without any deep notches in a temporal or spatial sense. A wavefield being as white as possible means that the wavefield has intensities at different frequencies and horizontal wavenumbers that are as similar as possible, giving it a relatively constant power spectral density. In at least one embodiment, each source element can emit band-limited white noise in order to achieve a relatively constant spectrum over a desired bandwidth in frequency and horizontal wavenumber. Formally, white noise is a random signal having equal intensity at different frequencies, giving it a constant power spectral density. Infinite-bandwidth white noise is a theoretical construction. The bandwidth of white noise is limited in practice by the mechanism of the noise generation, by the transmission medium, and by finite observation capabilities. Random signals can be considered as white noise if they have a flat spectrum over the range of frequencies that are relevant to their context. Unless specifically stated, embodiments of the present disclosure are not limited to emitting band-limited white noise. Based on the actuation of the source elements, a signal emitted at a given location can have low correlation with a signal emitted at one or more other locations to achieve a spatially white horizontal wavenumber spectrum. In at least one embodiment, one or more (or all) source elements can emit band limited white noise (band limited amplitude spectrum and randomized phase spectrum), resulting in the emission of different individual signals by the source elements that do not correlate. The signals emitted by the individual source elements at each location can approach band limited white noise that is unique to each location. The signal emitted by a source element or source unit can be uncorrelated with a signal emitted by another source element or source unit by having a reduced or minimized cross-correlation therebetween.

The air released by actuation of one air gun at a location should mostly escape from the water before air is released in the same location by actuation of another air gun. When air guns are towed at a depth of six meters, air bubbles released therefrom take approximately six seconds to reach the sea surface. If the marine survey vessel towing the air guns is moving at 2.5 meters/second, the spacing between source units 234 comprising air guns should be about 15 meters. Such spacing would allow air bubbles emitted from the source unit 234-1 at a given location to reach the surface before the source unit 234-2 passes through the given location. As a result, there will be a time gap between signals emitted by the first source unit 234-1 and the second source unit 234-2 at the given location. According to the present disclosure, the spacing between different source units 234 arranged in an inline configuration (as illustrated in FIG. 2) is randomized so that a randomized time gap exists between signal emissions for different source units 234 at a given location, within the constraints described above.

Figure 3:
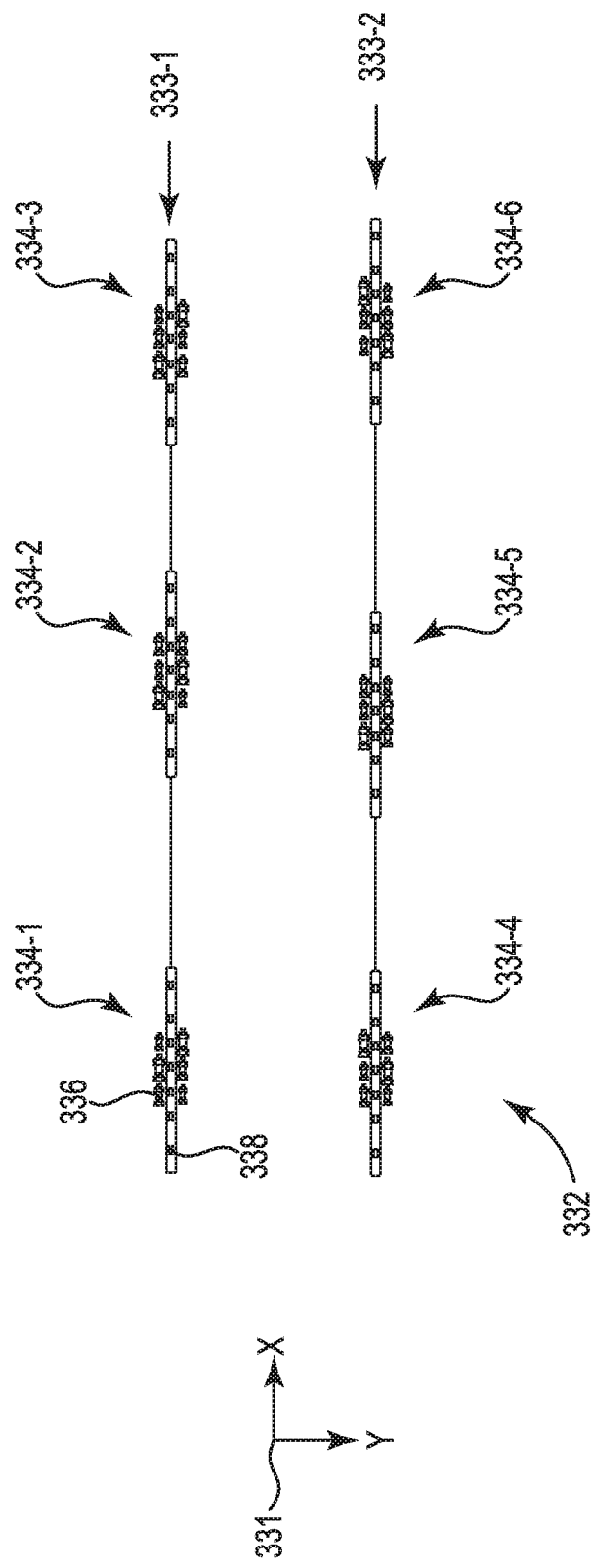
FIG. 3 illustrates a plan or xy-plane view of an example of an embodiment of a source array including a plurality of strings.

FIG. 3 illustrates a plan or xy-plane 331 view of an example of an embodiment of a source array 332 including a plurality of strings 333. The source array 332 includes a first plurality of source units 334-1, 334-2, 334-3 as a first string 333-1 and a second plurality of source units 334-4, 334-5, 334-6 as a second string 333-2. Both strings 333 can be towed by a same marine survey vessel, or each string 333 can be towed by a separate marine survey vessel. The direction of towing is in the direction of the x-axis, opposite of the arrow, as illustrated in FIG. 3. Embodiments are not limited to a source array 332 including any specific number of strings 333. Each of the source units 334 includes a plurality of source elements, such as the source element 336. A source unit 334 can include a number of receivers, such as the nearfield hydrophone 338, coupled thereto for recording a signal emitted by the source unit 334.

Each of the strings 333 is extended in line at different crossline positions, which can improve acquisition efficiency. Each string 333 can be solved for independently as a separate source. Thus, in the example illustrated in FIG. 3, the first string 333-1 represents a first source and the second string 333-2 represents a second source.

FIG. 4 illustrates a plan or xy-plane 431 view of an example of an embodiment of a source array 432 including a plurality of strings 433 with different crossline positions. The source array 432 includes a first plurality of source units 434-1, 434-2, 434-3 as a first string 433-1 and a second plurality of source units 434-4, 434-5, 434-6 as a second string 433-2. All of the source units 434 can be towed by a same marine survey vessel or by different numbers of marine survey vessels. Each of the source units 434 includes a plurality of source elements, such as the source element 436. A source unit 434 can include a number of receivers, such as the nearfield hydrophone 438, coupled thereto for recording a signal emitted by the source unit 434.

Each source unit 434 of the strings 433 is extended in line at different crossline positions. Corresponding source units 434 of the different strings 433 can have corresponding crossline positions in an opposite crossline direction. For example, the source unit 434-1 can be offset from the x-axis by a first distance in a crossline direction and the source unit 434-4 can be offset from the x-axis by the first distance in the opposite crossline direction. The source unit 434-2 can be offset from the x-axis by a second distance (less than the first distance) in a crossline direction and the source unit 434-5 can be offset from the x-axis by the second distance in the opposite crossline direction. The source unit 434-3 can be offset from the x-axis by a third distance (less than the first distance and the second distance) in a crossline direction and the source unit 434-6 can be offset from the x-axis by the third distance in the opposite crossline direction. The crossline distance can be relatively small to limit the directivity in the crossline direction. For example, the crossline distance can be approximately six meters. For purposes of source deconvolution, each string 433 can be solved for independently as a separate source. Thus, in the example illustrated in FIG. 4, the first string 433-1 represents a first source and the second string 433-2 represents a second source.

The direction of towing is in the direction of the x-axis, opposite of the arrow, as illustrated in FIG. 4. At least one embodiment of the present disclosure can include a method comprising towing a first plurality of source units 434-1, 434-2, 434-3 with a respective crossline separation between successive source units of the first plurality of source units 434-1, 434-2, 434-3 and towing a second plurality of source units 434-4, 434-5, 434-6 with a respective crossline separation between successive source units of the second plurality of source units 434-4, 434-5, 434-6. Successive source units 434 are source units that follow each other in order. For example, the source unit 434-2 is successive to the source unit 434-1 and the source unit 434-3 is successive to the source unit 434-2. The method can include actuating the first plurality of source units 434-1, 434-2, 434-3 near-continuously to cause a respective signal emitted by each one of the first plurality of source units to be uncorrelated with signals emitted by the other source units of the first plurality of source units. For example, the signal emitted by the source units 434-1 is uncorrelated with the signals emitted by the source unit 434-2 and the source unit 434-3. The method can include actuating the second plurality of source units 434-4, 434-5, 434-6 near-continuously to cause a respective signal emitted by each one of the second plurality of source units to be uncorrelated with signals emitted by the other source units of the second plurality of source units. For example, the signal emitted by the source unit 434-4 is uncorrelated with the signals emitted by the source unit 434-5 and the source unit 434-6. The correlation or uncorrelation of signals emitted by the first plurality of source units 434-1, 434-2, 434-3 versus the second plurality of source units 434-4, 434-5, 434-6 may not be relevant for consideration. In other words, it is acceptable for some cross-correlation to occur between the first plurality of source units 434-1, 434-2, 434-3 and the second plurality of source units 434-4, 434-5, 434-6 because the first and second pluralities of source units are treated as separate sources for purposes of data processing, whereas the first plurality of source units 434-1, 434-2, 434-3 (and the second plurality of source units 434-4, 434-5, 434-6) are treated as a single source emitting a "same" signal over an extended period of time for a given location.

Figure 5A:
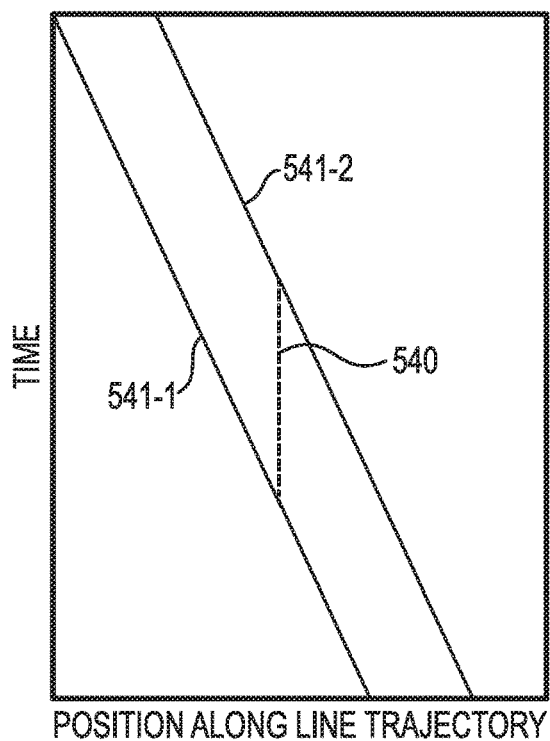
FIG. 5A is a plot of receiver position versus time.

FIG. 5A is a plot of receiver position versus time. The receiver positions are indicated by the region between the first solid line 541-1 and the second solid line 541-2 and are illustrated along a line trajectory as a function of time in a marine towed streamer acquisition. The marine survey vessel moves from the left to the right and time increases toward the bottom of the figure. The plot in FIG. 5A can be referred to as a matrix, where each column (trace) represents a location through which receivers may pass. The dashed line 540 in FIG. 5A on top of the receiver positions represents data recorded at one location.

Figure 5B:
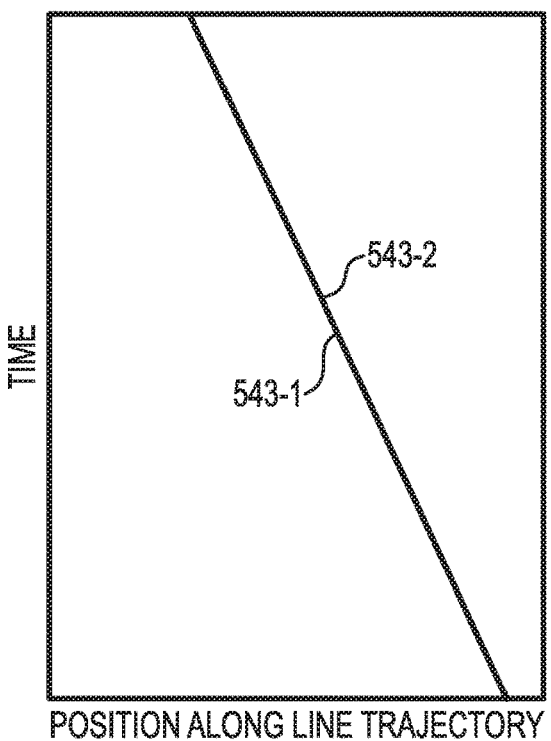
FIG. 5B is a plot of source position versus time.

FIG. 5B is a plot of source position versus time. The source positions are indicated by the region between the first solid line 543-1 and the second solid line 543-2, which are so close together that they appear as one thick solid line. The source positions are illustrated along a line trajectory as a function of time in a marine towed streamer acquisition analogous to that of FIG. 5A. The plot in FIG. 5B can be referred to as a matrix, where each column (trace) represents a location through which sources may pass. As shown by Equation 1, the temporal length of a live data trace can depend on the speed of the streamer relative to the surface of the earth and length of the streamers:

$$T = L/V \qquad (1)$$

where T is the temporal length of the receiver trace in a location, L is the streamer length, and V is the speed over the surface of the earth. The same equation applies to the strings of sources described herein.

The inline length of a source array is typically very limited. If one source element is towed behind a vessel while emitting signals near-continuously, then, in principle, the source element emits a spike at each stationary source position as indicated by the line along the diagonal on the source matrix of FIG. 5B. However, in practice, the temporal length of a signal emitted by a source element at each location may not be a perfect spike because seismic data may not be processed to infinite temporal and spatial resolution. The lower the resolution at which seismic data is processed, the longer an effective temporal length can contribute to each location.

Figure 6A:
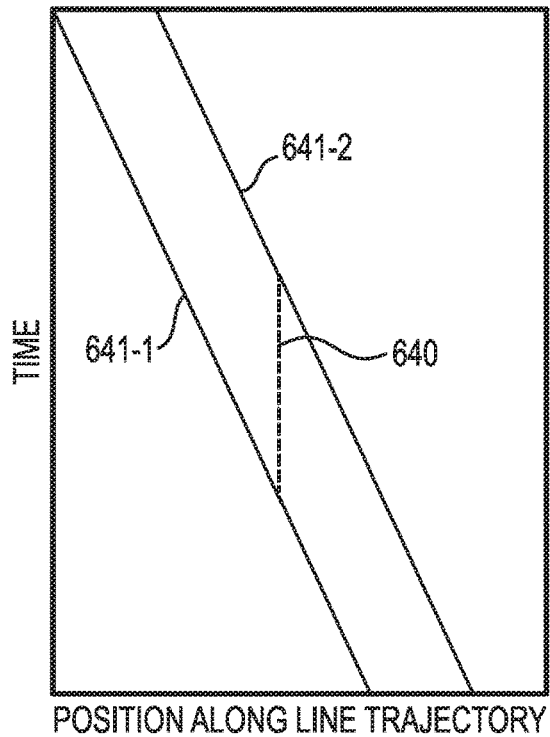
FIG. 6A is a plot of receiver position versus time.

However, according to at least one embodiment of the present disclosure, the source can be extended in length in an inline direction to further extend the temporal length of the signal emitted by a source element at each location to improve the signal-to-noise ratio. FIG. 6A is a plot of receiver position versus time. The receiver positions are indicated by the region between the first solid line 641-1 and the second solid line 641-2 and are illustrated along a line trajectory as a function of time in a marine towed streamer acquisition. The marine survey vessel moves from the left to the right and time increases toward the bottom of the figure. The dashed line 640 in FIG. 6A on top of the receiver positions represents data recorded at one location through which receivers may pass.

Figure 6B:
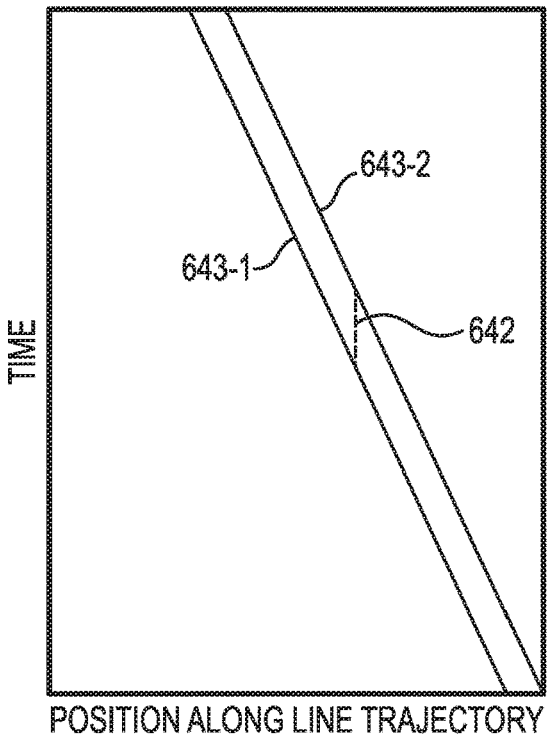
FIG. 6B is a plot of source position versus time according to an example embodiment.

FIG. 6B is an example of an embodiment of a plot of source position versus time. The source positions are indicated by the region between the first solid line 643-1 and the second solid line 643-2 and are illustrated along a line trajectory as a function of time in a marine towed streamer acquisition analogous to that of FIG. 6A. In FIG. 6B, the inline length of a source has been extended to increase the temporal length of a signal emitted by the source at each location as illustrated by the dashed line 642 on top of the source positions. The dashed line 642 on top of the source positions illustrates the temporal length of signals emitted by the source for a given location.

Figure 7:
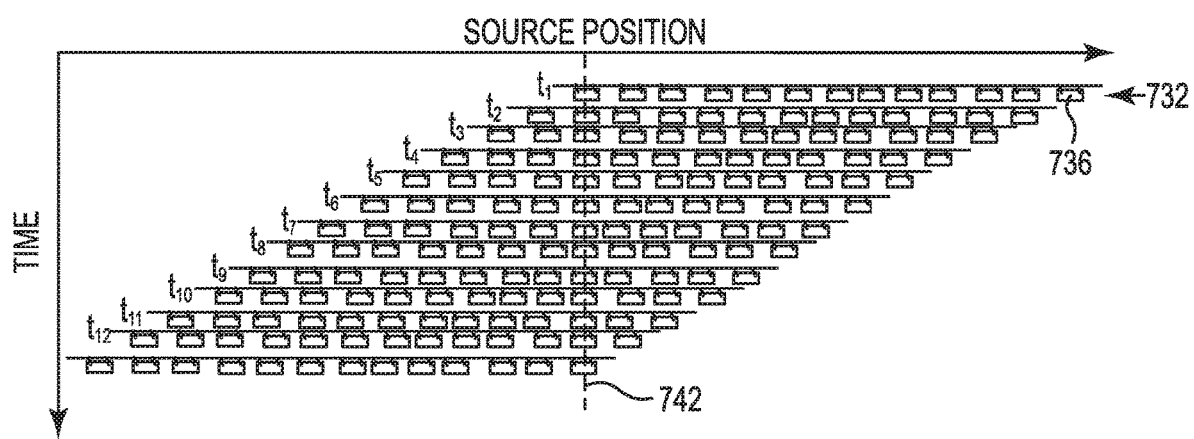
FIG. 7 is a plot of source position versus time for a source array according to an example embodiment.

FIG. 7 is an example of an embodiment of a plot of source position versus time for a source array 732. The source array 732 comprises of a plurality of source elements, such as the source element 736. Although not specifically illustrated, the source array 732 can be coupled to one or more depth control devices, such as floatation devices, that cooperate to form a long source in an inline direction with a consistent depth in the inline direction. Although not specifically illustrated, the source array 732 can be coupled to one or more position control devices, which can include a plurality of wings that can provide directional control in up to six degrees of freedom, which cooperate to form a long source that is maintained linearly in an inline direction. In at least one embodiment, the position control devices can also function as depth control devices. The inline length of the source array 732 according to the present disclosure can be significantly longer than previous marine source arrays. The inline length of some previous marine source arrays may be ten to fifteen meters. In contrast, in at least one embodiment of the present disclosure, the inline length of the source array 732 may be 100 meters, as a non-limiting example. If the inline length of the source array 732 is 100 meters and a marine survey vessel towing the source is moving at a velocity of two meters per second, then the temporal length of a signal emitted by the source array 732 at a location would be at least 50 seconds.

The source positions are indicated at twelve discrete times indicated by $t_1, t_2, t_3, t_4, t_5, t_6, t_7, t_8, t_9, t_{10}, t_{11}, t_{12}$ along a line trajectory as a function of time in a marine towed streamer acquisition. The marine survey vessel moves from the right to the left (contrary to FIGS. 5A-5B and 6A-6B) and time increases toward the bottom of the figure. In FIG. 7, the inline length of a source has been extended to increase the temporal length of a signal emitted by the source at each location as illustrated by the dashed line 742 on top of the source positions. The dashed line 742 on top of the source positions illustrates the temporal length of a signal emitted by the source for a given location. The dashed line 742 also indicates that each of the plurality of source elements of the source array pass through a location as the marine survey vessel moves.

Towing source elements behind a moving vessel means that each source element passes through a given location along the line trajectory at one moment in time. As illustrated in FIG. 7, if multiple source elements are towed in a string and each source element emits a signal that is near-continuous, then a second source element behind a first source element will emit signals at the same location that the first source element emitted signals at a slightly earlier moment in time. By towing several source elements in an extended inline string, the temporal length of the signal emitted at a given location along the line trajectory is extended by multiple source elements emitting signals at the same location. The temporal length of the signal emitted at each stationary source location can be related to the length of the string of source elements and the towing speed. See Equation 1, for example.

While FIG. 7 indicates that each source element in the source array 732 can pass through a location indicated by the dashed line 742, embodiments of the present disclosure do not require that each source element be actuated at the same location. Rather, at least one embodiment of the present disclosure includes the generation of an elongate wavefield in all inline positions rather than multiple realizations of actuations in a specific location. For example, multiple strings of source elements can be towed, for example, as illustrated in FIGS. 2-4. The individual source elements can be actuated with short randomized time intervals to create a near-continuous wavefield. The time intervals can be in short succession, such as less than ⅕ of an interval of conventional actuations. If multiple strings of source elements are used, the randomization can be independent for different strings, but the collective signal emitted by the source elements of the different strings is considered as a large near-continuous wavefield. FIG. 7, therefore, shows the positioning of various source elements over time, but does not necessarily correlate to actuation locations of the source elements. One or more of the source elements can be a non-impulsive source element, such as a marine vibrator, that is emitting signals near-continuously.

Different types of source elements can be used to produce signals. For example, a marine vibrator can be used to produce signals with a low correlation to signals emitted by other source elements. For example, a marine vibrator can be actuated according to an orthogonal sequence, such as a Gold sequence or an m-sequence, when sweeping. Gold sequences and m-sequences are made orthogonal from sequence-to-sequence and include minimal crosstalk when the sequences are correlated with each other. Sources that are actuated according to an orthogonal sequence produce signals that are uncorrelated. For example, their correlation can be less than or equal to $2^{(n+2)}+1$, where n is the size of a linear feedback shift register used to generate a maximum length sequence. Unlike linear sweeps, with Gold sequences a broad frequency range is emitted during the entire sequence. In at least one embodiment, a single string of source elements can include different types of source elements, such as air guns and marine vibrators.

A signal-to-noise ratio is approximately proportional to the square root of the length of the source wavefield at a source location. In a first example, a source wavefield approximating white noise is emitted at a source location with a temporal length of one second. In a second example, a source wavefield approximating white noise is emitted at a source location with a temporal length of 50 seconds (due to the length of the source passing through the location). The signal-to-noise ratio is improved from the first example to the second example by approximately a factor of seven (approximately seventeen decibels). The improved signal-to-noise ratio can be maintained at high marine survey vessel speeds, such as speeds greater than two meters per second.

Some previous approaches may include a string of air guns to create a directional wavefield by actuating the air guns along the string simultaneously. Such approaches may emit a total wavefield with a limited horizontal bandwidth (low bandwidth of the horizontal wavenumber spectrum) in the inline direction. In contrast, at least one embodiment of the present disclosure includes actuating source elements of a string of source elements with little or no correlation between the signals emitted individually by the source elements to generate a total wavefield (signal) that is broadband both in a temporal and spatial sense. With respect to seismic exploration, a broadband signal refers to a wider band of frequencies than is conventional. Further in contrast, at least one embodiment of the present disclosure can include generation of an omnidirectional wavefield that is extended in time at each source location. This can be achieved by emitting signals from one source element that do not correlate with signals emitted from the other source elements along the string. The omnidirectional wavefield can have a white horizontal wavenumber spectrum.

Figure 8:
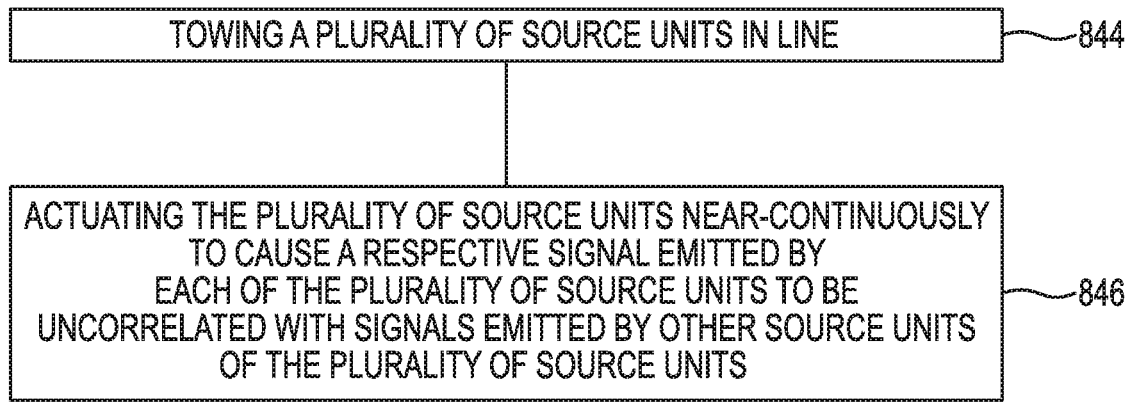
FIG. 8 illustrates an example of an embodiment of a method using inline sources.

FIG. 8 illustrates an example of an embodiment of a method using inline sources. At 844, the method can include towing, by a marine survey vessel, a plurality of source units inline. The source units can include one or more source elements. At 846, the method can include actuating the plurality of source units near-continuously to cause a respective signal emitted by each of the plurality of source units to be uncorrelated with signals emitted by other source units of the plurality of source units.

The plurality of source units can be a first plurality of source units. The method can include towing a second plurality of source units in line in a different crossline position than the first plurality of source units, for example as illustrated in FIG. 3. The method can further include actuating the second plurality of source units near-continuously to cause a respective signal emitted by each of the second plurality of source units to be uncorrelated with signals emitted by other source units of the plurality of source units.

In at least one embodiment, the method can include actuating each of the source units randomly according to an orthogonal sequence, such as a Gold sequence. The source units can be actuated to cause the respective signal emitted by each of the source units to have a random phase spectrum. The phase spectrum refers to the range of phases of the signal as a function of frequency. The random phase spectra can help reduce correlation of the emitted signals. The source units can be actuated to cause the respective signal emitted by each of the source units to comprise band limited white noise.

In accordance with at least one embodiment of the present disclosure, a geophysical data product may be produced or manufactured. Geophysical data may be obtained from a marine survey and stored on a non-transitory, tangible machine-readable medium. Obtaining the geophysical data can include towing, by a marine survey vessel, source units in line and actuating the source units near-continuously to cause a respective signal emitted by each of the source units to be uncorrelated with signals emitted by other source units. The geophysical data product may be produced by processing the geophysical data offshore or onshore either within the United States or in another country. The geophysical data product can be recorded on a non-transitory machine-readable medium, thereby creating the geophysical data product. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Figure 9:
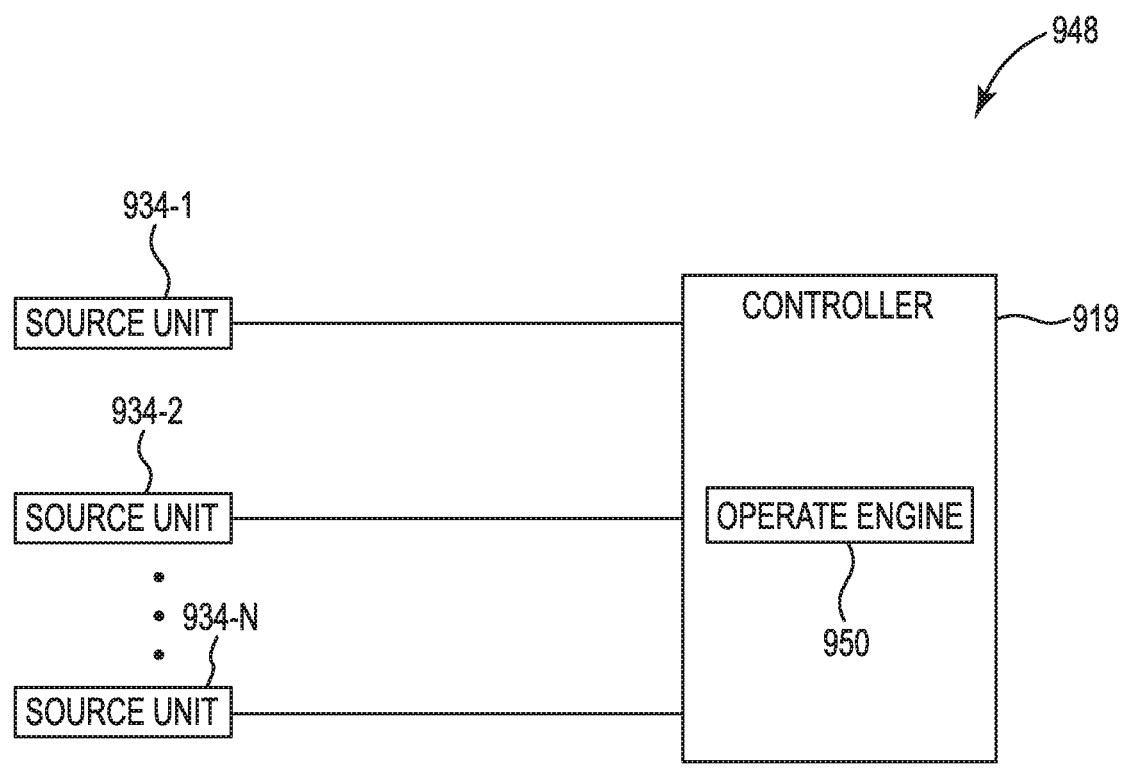
FIG. 9 illustrates an example of an embodiment of a system for inline sources.

FIG. 9 illustrates an example of an embodiment of a system 948 for inline sources. The system 948 can include a plurality of source units 934-1, 934-2, . . . , 934-N configured to be coupled to a controller 919. The controller 919 can include a number of engines, such as a source operation engine ("operate engine") 950. The controller 919 can be analogous to the controller 119 illustrated in FIG. 1. The controller 919 and engine 950 can be in communication with the source units 934 via one or more communication links.

The controller 919 can include more or fewer engines than illustrated to perform the various functions described herein. The controller 919 can represent program instructions and/or hardware of a machine. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The controller 919 can utilize software, hardware, firmware, and/or logic to perform a number of functions. The controller 919 can be a combination of hardware and program instructions configured to perform a number of functions and/or actions. The hardware, for example, can include a number of processing resources and a number of memory resources, such as a machine-readable medium or other non-transitory memory resources. The memory resources can be internal and/or external to the controller 919, for example, the controller 919 can include internal memory resources and have access to external memory resources. The program instructions, such as machine-readable instructions, can include instructions stored on the machine-readable medium to implement a particular function. The set of machine-readable instructions can be executable by one or more of the processing resources. The memory resources can be coupled to the controller 919 in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources can be coupled to the memory resources via a communication path. The communication path can be local or remote to the controller 919. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

The operate engine 950 can include a combination of hardware and program instructions that is configured to operate a first source unit 934-1 near-continuously to cause the first source unit 934-1 to emit a first broadband signal. The operate engine can include a combination of hardware and program instructions that is configured to operate a second source unit 934-2 near-continuously to cause the second source unit 934-2 to emit a second broadband signal such that the first broadband signal is uncorrelated with the second broadband signal and such that the first broadband signal and the second broadband signal create a combined signal having a temporal length at a location greater than a respective temporal length of the first broadband signal or the second broadband signal at the location. In at least one embodiment, the first source unit can be a non-impulsive source unit and the second source unit can be an impulsive source unit.

In at least one embodiment, although not specifically illustrated in FIG. 9, the second source unit 934-2 can be coupled to the first source unit 934-1 in line. The controller 919 can include a combination of hardware and program instructions that is configured to operate a third source unit near-continuously to cause the third source unit to emit a third broadband signal and to operate a fourth source unit near-continuously to cause the fourth source unit to emit a fourth broadband signal that is uncorrelated with the third broadband signal. The third source unit can be coupled in line with the fourth source unit and offset from the first source unit and the second source unit in a crossline direction, such as is illustrated in FIG. 3.

In at least one embodiment, the first source unit 934-1 and the second source unit 934-2 can be directly coupled to a marine survey vessel. The first source unit 934-1 can be offset from the second source unit 934-2 in a crossline direction, as illustrated in FIG. 4. The controller 919 can include a combination of hardware and program instructions that is configured to operate a third source unit near-continuously to cause the third source unit to emit a third broadband signal and to operate a fourth source unit near-continuously to cause the fourth source unit to emit a fourth broadband signal that is uncorrelated with the third broadband signal. The third source unit can be offset from the fourth source unit in the crossline direction.

Figure 10:
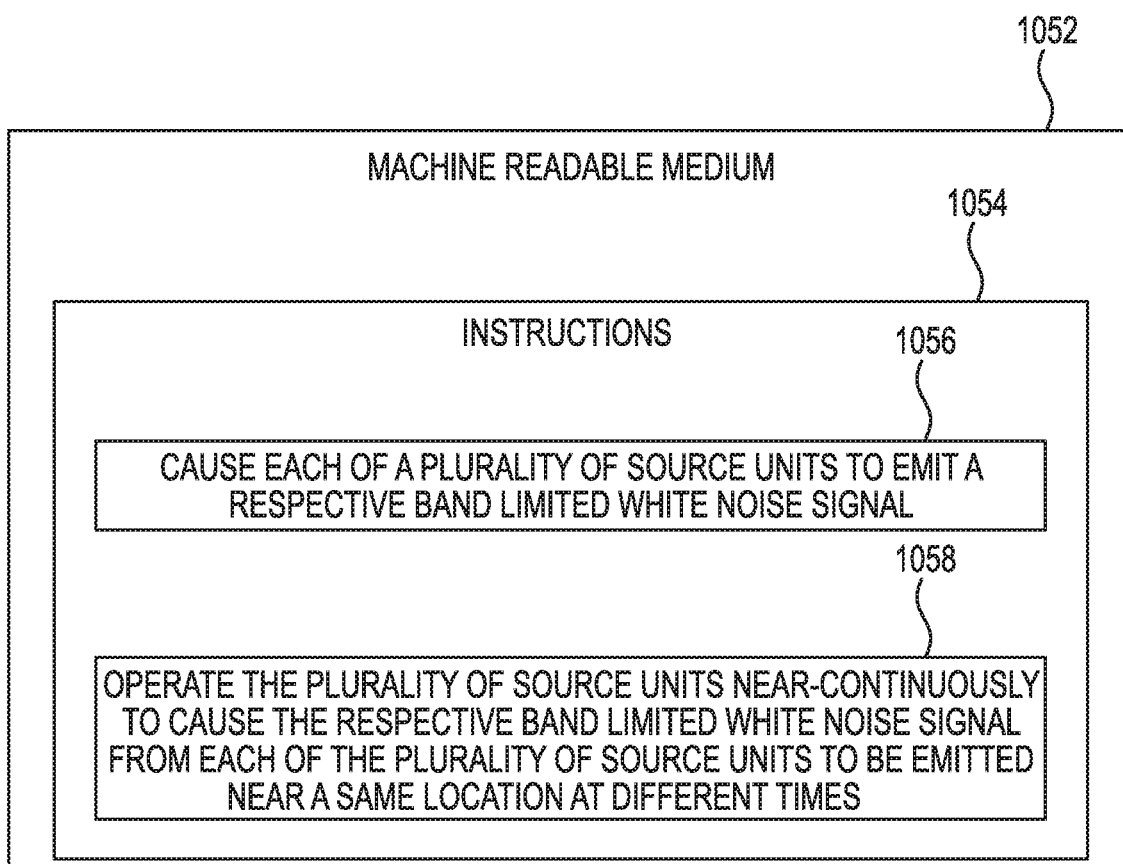
FIG. 10 illustrates an example of an embodiment of a machine for inline sources.

FIG. 10 illustrates an example of an embodiment of a machine readable medium 1052 for inline sources. As shown in FIG. 10, the machine-readable instructions 1054 stored in the machine readable medium 1052 can be segmented into a number of modules 1056, 1058, that when executed by a processing resource can perform a number of functions. As used herein, a module includes a set of instructions included to perform a particular task or action. The number of modules can be sub-modules of other modules or the number of modules can comprise individual modules separate and distinct from one another. Examples are not limited to the specific modules 1056, 1058 illustrated in FIG. 10.

In at least one embodiment, the module 1056 can include instructions executable by a processing resource to cause each of a plurality of source units to emit a respective band limited white noise signal. The plurality of source units can be arranged in line for towing by a marine survey vessel. The module 1058 can include instructions executable by a processing resource to operate the plurality of source units near-continuously to cause the respective band limited white noise signal from each of the plurality of source units to be emitted near a same location at different times.

In at least one embodiment, the source units can be non-impulsive source units and the instructions 1054 can be executed to actuate an impulsive source unit during operation of the non-impulsive source units. The instructions 1054 can be executed to randomly actuate each of a plurality of impulsive source units arranged in line for towing by the marine survey vessel. The instructions 1054 can be executed to randomly actuate each of the impulsive source units according to an orthogonal sequence, for example.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
towing a seismic source array in a body of water at a towing depth, at a towing speed, and in a towing direction;
wherein the seismic source array comprises a plurality of source units arranged substantially in-line with one another in the towing direction;
wherein a minimum spacing between consecutive source units in the seismic source array equals or exceeds the towing speed multiplied by the towing depth;
wherein a distance between source units disposed on opposite ends of the source array defines a maximum spacing;
wherein the maximum spacing divided by the towing speed defines a temporal source length in units of time; and
activating each of the source units independently throughout the temporal source length, in a series of source unit activations, in a manner such that each source unit activation in the series is substantially uncorrelated with other source unit activations in the series, and such that each of the source units is activated at least once during the temporal source length.

2. The method of claim 1, wherein:
the temporal source length equals or exceeds 50 seconds.

3. The method of claim 1, wherein:
the minimum spacing equals or exceeds 15 meters.

4. The method of claim 1, wherein:
the maximum spacing equals or exceeds 100 meters.

5. The method of claim 1, wherein:
spacings between the source units in the seismic source array are randomized, subject to the minimum spacing.

6. The method of claim 1, wherein:
time intervals between activations of individual source units within the seismic source array are randomized.

7. The method of claim 1, wherein:
time intervals between activations of individual source units within the seismic source array are not longer than ⅕ of a conventional activation time interval;
wherein the conventional activation time interval corresponds to a discharge/recharge cycle time for an air gun.

8. The method of claim 1, wherein:
the series of source activations produces a substantially omnidirectional source wavefield from the seismic source array.

9. The method of claim 1, wherein:
at least one of the source units includes an impulsive source element.

10. The method of claim 9, wherein:
each of the source units includes an impulsive source element.

11. The method of claim 10, wherein:
none of the source units includes a non-impulsive source element.

12. The method of claim 1, wherein:
at least one of the source units includes a non-impulsive source element.

13. The method of claim 12, wherein:
each of the source units includes a non-impulsive source element.

14. The method of claim 13, wherein:
none of the source units includes an impulsive source element.

15. The method of claim 1, further comprising:
recording, in a non-transitory computer readable medium, geophysical data produced by receivers responsive to acoustic energy produced by the seismic source array, thereby manufacturing a geophysical data product.

16. A system, comprising:
a seismic source array comprising a plurality of source units configured to be arranged substantially in-line with one another in a towing direction, and configured to be towed at a towing depth and at a towing speed;
wherein a minimum spacing between consecutive source units in the seismic source array equals or exceeds the towing speed multiplied by the towing depth;
wherein a distance between source units disposed on opposite ends of the source array defines a maximum spacing;
wherein the maximum spacing divided by the towing speed defines a temporal source length in units of time; and
a controller configured to activate each of the source units independently throughout the temporal source length, in a series of source unit activations, in a manner such that each source unit activation in the series is substantially uncorrelated with other source unit activations in the series, and such that each of the source units is activated at least once during the temporal source length.

17. The system of claim 16, wherein:
the temporal source length equals or exceeds 50 seconds.

18. The system of claim 16, wherein:
the minimum spacing equals or exceeds 15 meters.

19. The system of claim 16, wherein:
the maximum spacing equals or exceeds 100 meters.

20. The system of claim 16, wherein:
spacings between the source units in the seismic source array are randomized, subject to the minimum spacing.

21. The system of claim 16, wherein:
time intervals between activations of individual source units within the seismic source array are randomized.

22. A method, comprising:
towing a seismic source array in a body of water at a towing depth, at a towing speed, and in a towing direction;
wherein the seismic source array comprises a plurality of source units arranged substantially in-line with one another in the towing direction;
wherein a distance between source units disposed on opposite ends of the source array defines a maximum spacing;
wherein the maximum spacing divided by the towing speed defines a temporal source length in units of time that equals or exceeds 50 seconds; and
throughout the temporal source length, activating the source units in a manner such that signals emitted by each source unit in the seismic source array are substantially uncorrelated with signals emitted by other source units in the seismic source array, and such that each of the source units is activated at least once during the temporal source length.

* * * * *